United States Patent [19]

Chikuma

[11] Patent Number: 4,724,717
[45] Date of Patent: Feb. 16, 1988

[54] RACK SHAFT SUPPORTING DEVICE

[75] Inventor: Isamu Chikuma, Maebashi, Japan

[73] Assignee: Nippon Seiko Kabushiki Kaisha, Tokyo, Japan

[21] Appl. No.: 902,639

[22] Filed: Sep. 2, 1986

[51] Int. Cl.$^4$ .............................................. B62D 3/12
[52] U.S. Cl. ...................................... 174/498; 74/422
[58] Field of Search ........................ 74/89.12, 422, 498

[56] References Cited

U.S. PATENT DOCUMENTS

| 3,505,895 | 2/1986 | Ravenel | 74/498 |
| 3,505,898 | 4/1970 | Bradshaw | 74/422 |
| 3,777,589 | 12/1973 | Adams | 74/498 |
| 4,322,986 | 4/1982 | Adams et al. | 74/498 |
| 4,400,991 | 8/1983 | Breitweg et al. | 74/498 |
| 4,619,155 | 10/1986 | Futaba | 74/498 |

FOREIGN PATENT DOCUMENTS

| 184060 | 10/1984 | Japan | 74/498 |
| 946501 | 1/1964 | United Kingdom | 74/498 |
| 426094 | 10/1974 | U.S.S.R. | 74/424.8 R |

Primary Examiner—Lawrence Staab
Attorney, Agent, or Firm—Shapiro and Shapiro

[57] ABSTRACT

A rack shaft support device is provided for rack and pinion steering of the type having a housing containing a pinion rotatable by the rotating operation of a steering wheel and a rack shaft engaged with the pinion and axially movable by the rotation thereof to steer wheels. The device comprises an antifriction support including an antifriction roller contacting the rack shaft, a mechanism biasing the antifriction support toward the pinion, a vibration absorbing member urged against the antifriction member and absorbing vibration of the rack shaft by friction, and a limiting member disposed concentrically about the rack shaft and limiting transverse displacement of the rack shaft to a predetermined amount.

8 Claims, 4 Drawing Figures

RACK SHAFT SUPPORTING DEVICE

BACKGROUND OF THE INVENTION

1. Field of the Invention

This invention relates to a rack shaft supporting device for rack-pinion steering of a vehicle, and more particularly to a rack shaft supporting device in a rack-pinion type steering apparatus used as the steering apparatus of a passenger car or the like. The device supports a rack shaft by antifriction support means capable of adjusting the load bearing area and subjected to a friction force and includes limiting means for limiting the displacement of the rack shaft over a predetermined amount.

2. Related Background Art

The rack-pinion type steering apparatus is widely used in FF type vehicles because it is simple in structure, inexpensive, and precise in steering as compared with the ball-screw type steering apparatus heretofore universally used.

However, as the utilization of the rack-pinion type steering apparatus has spread, problems have come to be recognized in connection with the rack shaft supporting device.

Generally, in order to prevent back-lash from occurring in the mesh engagement between the rack and the pinion, a rack shaft supporting device which urges the rack shaft toward the pinion is provided on the rack at a position opposed to the pinion. One such device which uses a sliding support is popular, but one utilizing an antifriction support has also been studied.

In a rack shaft supporting device of the type in which a shaft supporting member is urged toward the pinion by a spring and the rack shaft is sliding-supported by a bearing surface, the rack shaft is always surface-supported, and therefore, a great steering force is necessary.

On the other hand, in a rack shaft supporting device of the type in which a rolling antifriction member is utilized to support the rack shaft, the antifriction member is subjected to the severe shock from the road surface and therefore, it is necessary to reinforce the rolling portion. In addition, the support of the rack shaft is point-support or line-support, and this has led to a problem in that minute swivelling vibration (hereinafter referred to as "shimmy") of wheels is liable to occur during high-speed driving.

Further, according to the latest studies, a two-phase type rack shaft supporting device is known which uses both the sliding support and the antifriction support.

For example, a two-phase type rack shaft supporting device has been proposed which effects sliding support in low load conditions and additionally effects antifriction support in a special high load condition. In this case, the sliding support is used in normal conditions and is supplemented by the antifriction support in a very high load condition. Therefore, the steering force is not reduced, and it is necessary to reinforce the antifriction support portion for an excessively great load. This leads to a problem in that a compact construction is difficult to achieve.

Also, a two-phase type rack shaft supporting device has been proposed which utilizes antifriction support in low load conditions and sliding support in high load conditions. However, in such a rack shaft supporting device, the rack shaft is supported only by antifriction support in the low load conditions such as high-speed driving. Therefore, the support becomes point-support or line-support, and the absorption of shimmy is liable to become insufficient.

SUMMARY OF THE INVENTION

It is an object of the present invention to provide a rack shaft supporting device which can eliminate the above-noted disadvantages peculiar to the prior art. That is, it is an object of the present invention to provide a rack shaft supporting device which can achieve reduction in steering force, improved stability during high-speed running, suppression of the deterioration of performance, and an improved shimmy-proof charactreristic and which can achieve these results without making the entire supporting device overly bulky.

To achieve the above object, the present invention uses antifriction support means in low load conditions and means for limiting the displacement of the rack shaft over a predetermined amount in high load conditions. Reduction in the steering force can generally be achieved to a certain degree simply by using antifriction means for the support of the rack shaft, and the shimmy-proof characteristic can be further improved by adding a friction force to the antifriction support means.

In brief, the rack-pinion steering of the present invention has support means comprising antifriction support means which is always in contact with the rack and which is subjected to a friction force, and limiting means for bearing the rack load during a high load exceeding a predetermined load and limiting the displacement of the rack shaft. The design is made such that a load exceeding an adjustable predetermined load is not applied to the antifriction support means. Accordingly, no high load is applied to the antifriction support means, and therefore, the steering force is reduced and deterioration of performance is suppressed. The shimmy-proof characteristic is also improved particularly during high-speed running, as a result of vibration absorption provided by the above-mentioned friction force. Further, the limiting means is provided independently of the antifriction support means, and this leads to the compact and simple construction of the antifriction support means, which in turn leads to a reduced cost.

DESCRIPTION OF THE PREFERRED EMBODIMENTS

Figure 1:
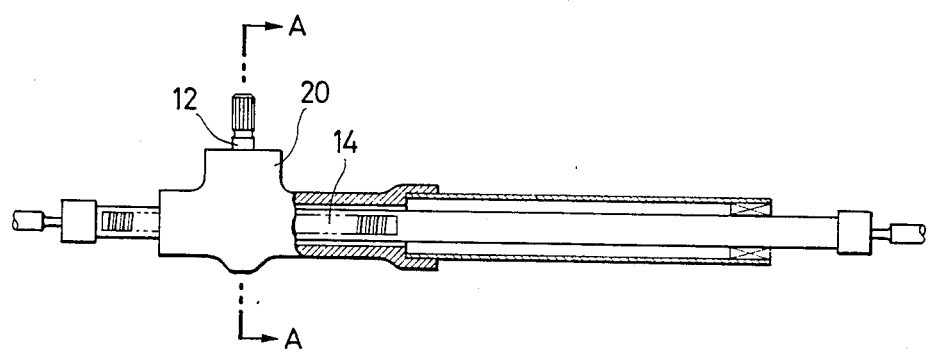
FIG. 1 shows rack-pinion type steering device according to the present invention.

Exemplary embodiments of the present invention will hereinafter be described with reference to the drawings, but it should be understood that the present invention is not restricted thereto.

In the drawings, element 12 represents a pinion, only the fore end of which is shown. It will be understood, of course, that the rear end of the pinion (not shown) is engaged with a steering shaft or the like and has a torque transmitted thereto from a steering wheel. The fore end of the pinion 12 is in mesh engagement with the teeth of a rack shaft 14 in a housing 20. At opposite ends of a toothed portion thereof, the fore end of the pinion is rotatably supported by ball bearings 16 and 18 disposed in the housing 20. The rack shaft 14 extends transversely of the pinion 12 and follows the rotation of the pinion 12 to rectilinearly move in a direction transversely intersecting the pinion 12. The rectilinear movement of the rack shaft 14 is transmitted to the right and left front wheels of the vehicle, and thus, the front wheels are steered to the right and left.

The housing 20 covers the meshing portions of the pinion 12 and the rack shaft 14, and the back side of the housing has a recess containing the antifriction support means 21 of the rack shaft 14 therein.

The antifriction support means 21 is constructed as follows.

A support member 30 is closely fitted in the aforementioned recess, and a through-hole parallel to the lengthwise axis of the pinion 12 and a space portion perpendicular to the through-hole are formed in the support device 30. An antifriction member comprising a roller 22, a bearing 24 and a pin 26 is incorporated in the through-hole and the space portion. More particularly, the pin 26 is supported by the through-hole, and the roller 22 and the bearing 24 are disposed in said space portion so that the roller 22 is rotatable relative to the pin 26 in response to reciprocal movement of the rack shaft 14. The longitudinal cross-sectional shape of the outer peripheral surface of the roller 22 is of course substantially similar to the transverse cross-sectional shape of the outer peripheral surface of the rack shaft 14, and the roller 22 and the rack shaft 14 are adapted to closely fit together when the roller 22 is urged against the rack shaft 14 by biasing means which will be described later.

Figure 2:
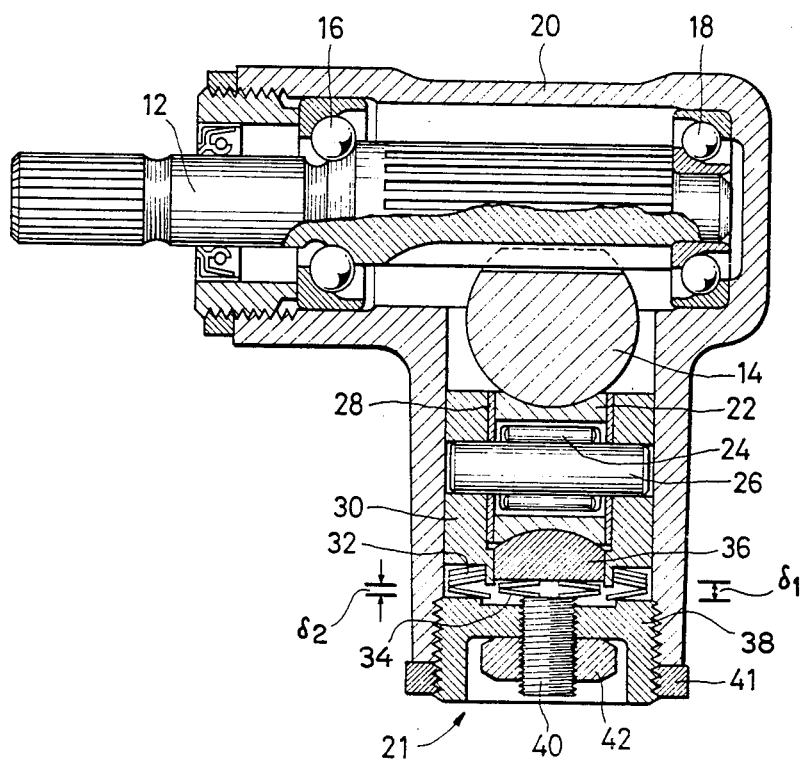
FIG. 2 is a cross-sectional view taken along line A—A of FIG. 1.

In the present embodiment, as shown in FIG. 2, a metal thrust bearing 28 is interposed between the support member 30 and the roller 22. This is for preventing the rack shaft 14 from moving to the right and left to cause shimmy when the rack shaft 14 receives rightward and leftward forces as viewed in FIG. 2. However, the thrust metal bearing 28 need not always be interposed, and the roller 22 may be directly received by the support member 30, whereby the support member 30 may be made to perform the above-described function.

On that side of the roller 22 which is opposite to the rack shaft 14, there is disposed a plunger 36 having a transverse cross-sectional shape closely fitting to the outer peripheral surface of the roller 22. At the lower end portion of the recess which houses the antifriction support means, a counter-sunk spring support member 38 having a threaded bore is threadably engaged with a threaded bore formed in the lower portion of the housing 20. A counter-sunk spring 32 is mounted between the counter-sunk spring support member 38 and the support member 30, whereby the support member 30 is urged toward rack shaft 14. Consequently, the roller 22 is biased and urged against the rack shaft 14. A counter-sunk spring support member 40 in the form of a screw is threadably engaged with a threaded hole formed in the central portion of the counter-sunk spring support member 38, and a counter-sunk spring 34 is mounted between the plunger 36 and the counter-sunk spring support member 40 to bring the plunger 36 into frictional engagement with the roller 22 and to bias and urge the roller 22 against the rack shaft 14 through the plunger 36. A nut 41 and a nut 42 are respectively threaded onto the counter-sunk spring support members 40 and 38. The nuts fix the respective positions of the spring support members and permit adjustment of the support members for the purpose of adjusting the biasing forces of the counter-sunk springs 32 and 34.

The counter-sunk springs 32 and 34 have the function of biasing the roller 22 and urging it against the rack shaft 14 as described above, and also permits the roller 22 to move downwardly as viewed in FIG. 2 to flexibly cope with the force applied to the rack shaft 14 through the rotation of the pinion 12. This movement distance has an upper limit which is a limit at which the counter-sunk springs 32 and 34 are collapsed. The lengths of the clearances secured by the counter-sunk springs 32 and 34 until the value of said upper limit is reached, that is, until the counter-sunk springs 32 and 34 are collapsed, are represented by $\delta_1$ and $\delta_2$. Of course, $\delta_1$ and $\delta_2$ are adjustable by nuts 41 and 42, and the biasing forces of the counter-sunk springs 32 and 34 and the values of $\delta_1$ and $\delta_2$ are adjusted so that the plunger 36 always urges the roller 22 into frictional engagement with rack shaft 14.

Figure 3:
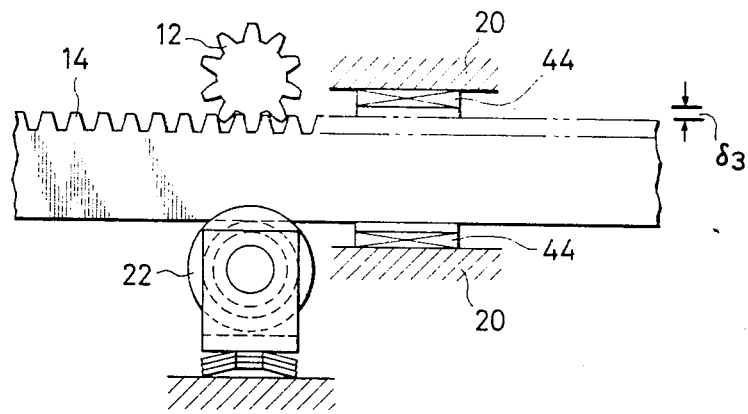
FIG. 3 shows some elements in a longitudinal cross-section of FIG. 1.

FIG. 3 shows a portion of the longitudinal cross-section of FIG. 1, and also shows limiting means for limiting the displacement of the rack shaft 14 over a predetermined amount. According to FIG. 3, at a location different from the location at which the rack shaft 14 is engaged with the roller 22 and pinion 12, an annular support member 44 concentric with and surrounding the rack shaft 14 is fixed to the inner surface of the housing 20. The clearance $\delta_3$ between the support member 44 and the rack shaft 14 is formed so as to be smaller than $\delta_1$ and $\delta_2$.

The operation of the rack-pinion steering by the above-described construction will now be described.

When the driver steers the steering wheel in either direction, the torque thereof is transmitted to the pinion 12 through the steering shaft (not shown). By the rotation of the pinion 12, the rack shaft 14 which is in mesh engagement with the pinion is moved slightly away from the pinion 12 with the roller 22 and the support member 30, and the rack shaft 14 and the pinion 12 becomes capable of transmitting torque. During the ordinary running or high-speed running this movement distance is smaller than the clearance $\delta_3$, and relatively small load on the rack shaft 14 is borne by the antifriction support means 21 and the plunger 36 which is biased by the counter-sunk spring 34. Although, $\delta_3$ is smaller than $\delta_1$ and $\delta_2$, the counter-sunk springs 34 and 32 are not greatly collapsed by the plunger 36 and the support member 30 under the foregoing conditions. Therefore, the rack shaft 14 does not bear against the support member 44. Simply supporting the rack shaft 14 with the antifriction support in this manner improves the shimmy-proof performance considerably. However, in the present invention, the plunger 36 is in frictional engagement with the roller 22, and the resulting friction force further enhances the rigidity of the entire antifriction support device 21 and absorbs vibration. This suppresses shimmy and further improves the stability of steering during high-speed running in particular.

When a relatively high load is applied to the rack shaft 14, the rack shaft 14 is moved against the biasing forces of the counter-sunk springs 32 and 34 until it comes into contact with the support member 44. In this case, any more load is borne by the housing 20 through the support member 44.

Accordingly, both during high load and low load, a load exceeding a predetermined load set by $\delta_1$, $\delta_2$ and $\delta_3$ (as adjusted through the nuts 41 and 42) will not be applied to the pin 26, which is the rotary shaft of the roller 22. Thus, the pin 26 will not be damaged. Because no excessive load is applied to the antifriction support means as described above, the antifriction support means need not be reinforced more than necessary. Also unlike the prior art, the limiting means is provided independently of the antifriction support means, and therefore, the antifriction support means can be made into a simple and compact construction.

Figure 4:
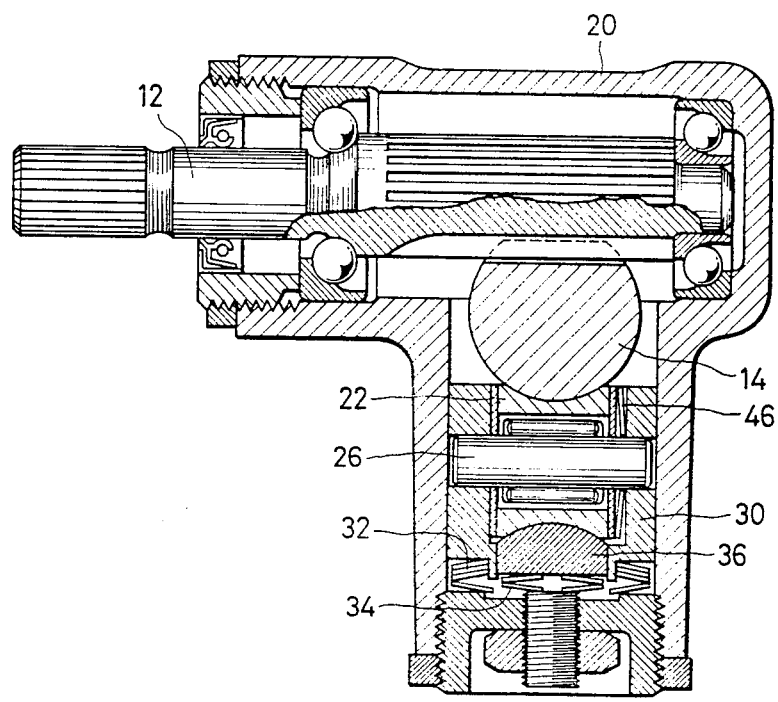
FIG. 4 shows another embodiment of the present invention.

FIG. 4 shows another embodiment of the present invention. The difference of this embodiment from the embodiment of FIG. 2 is that a counter-sunk spring 46 is interposed between the metal thrust bearing 28 and the support member 30. This counter-sunk spring 46 always biases the roller 22 in a direction parallel to the lengthwise direction of the pin 26 and produces a friction force between the thrust bearing 28 and the roller 22. Therefore, like the plunger 36, it improves the shimmy-proof property. Accordingly, even if the plunger 36 and the counter-sunk spring 34 are eliminated and the roller 22 is urged by only the counter-sunk spring 46, an effect similar to that of the FIG. 2 embodiment will be expected.

The support member 44 which is the limiting means according to the present invention can be comprised of a sliding support member such as a sleeve or an antifriction support member such as a bearing, and can also be comprised of biasing means added thereto.

I claim:

1. A rack shaft supporting mechanism for a rack and pinion type steering assembly having, in a housing, a pinion rotatable by the rotating operation of a steering wheel and a rack shaft engaged with said pinion by way of a rack and axially movable by rotation of said pinion to steer wheels, said supporting mechanism comprising:
   a roller disposed in said housing for rolling contact with said rack shaft at an outer peripheral surface of said rack shaft located opposite from said rack, said roller being supported by a supporting member;
   biasing means urging said roller toward said pinion with a predetermined force;
   vibration absorbing means including at least one friction member which is pressed against said roller and which absorbs vibration of said rack shaft by friction with said roller; and
   limiting means mounted adjacent to said rack shaft for limiting displacement of said rack shaft transversely of the rack shaft axis to a predetermined amount.

2. A rack shaft supporting mechanism according to claim 1, wherein said friction member is a plunger in intimate frictional contact with an outer peripheral surface of said roller located opposite from said rack shaft, and wherein said vibration absorbing means includes a spring urging said plunger against said roller.

3. A rack shaft supporting mechanism according to claim 2, including means for adjusting the force with which said spring urges said plunger against said roller.

4. A rack shaft supporting mechanism according to claim 2, wherein said vibration absorbing means further includes an additional spring interposed between said roller and said support member and urging said roller in the direction of a rotation axis of said roller such that said roller is pressed against another friction member.

5. A rack shaft supporting mechanism according to claim 1, wherein said vibration absorbing means comprises a spring interposed between said roller and said support member and urging said roller in the direction of a rotation axis of said roller to press said roller and said friction member into frictional contact with one another.

6. A rack shaft supporting mechanism according to claim 1, including means for adjusting said predetermined force of said biasing means.

7. A rack shaft supporting mechanism according to claim 1, including means for adjusting the force with which said friction member is pressed against said roller.

8. A rack shaft supporting mechanism according to claim 1, wherein said limiting means is mounted in said housing concentrically about said rack shaft.

* * * * *